United States Patent
Le et al.

(10) Patent No.: US 11,103,021 B2
(45) Date of Patent: Aug. 31, 2021

(54) HEADSET WITH DUAL BATTERY COMPARTMENT

(71) Applicant: Safariland, LLC, Jacksonville, FL (US)

(72) Inventors: David Trinh Le, Irvine, CA (US); John Brad Medine, Chino, CA (US); Anthony Lefeber, Canyon Lake, CA (US); Peter Hoang, Corona, CA (US)

(73) Assignee: Safariland, LLC, Jacksonville, FL (US)

( * ) Notice: Subject to any disclaimer, the term of this patent is extended or adjusted under 35 U.S.C. 154(b) by 105 days.

(21) Appl. No.: 16/502,669

(22) Filed: Jul. 3, 2019

(65) Prior Publication Data

US 2019/0320753 A1 Oct. 24, 2019

Related U.S. Application Data

(63) Continuation-in-part of application No. 15/163,936, filed on May 25, 2016, now Pat. No. 10,350,113.

(51) Int. Cl.
*H04R 1/10* (2006.01)
*A42B 3/04* (2006.01)
(Continued)

(52) U.S. Cl.
CPC .............. *A42B 3/0406* (2013.01); *A42B 3/30* (2013.01); *H04R 1/105* (2013.01); *H04R 1/1025* (2013.01);
(Continued)

(58) Field of Classification Search
CPC .... H04R 1/1025; H04R 1/1033; H04R 1/105; H04R 5/033; H04R 25/602;
(Continued)

(56) References Cited

U.S. PATENT DOCUMENTS

| 3,430,261 A | 3/1969 | Benner |
| 3,579,075 A * | 5/1971 | Floyd ................... H02J 7/0045 320/110 |

(Continued)

FOREIGN PATENT DOCUMENTS

| KR | 10-1289968 B1 | 7/2013 |
| WO | 2016012811 A1 | 1/2016 |

(Continued)

OTHER PUBLICATIONS

PCT Application No. PCT/IB17/000654, International Search Report and Written Opinion dated Nov. 27, 2017.
(Continued)

*Primary Examiner* — Huyen D Le
(74) *Attorney, Agent, or Firm* — Kane Kessler, P.C.; Paul E. Szabo

(57) ABSTRACT

A headset includes two earcups that overlie and seal around the wearer's ears. The headset includes a system for suspension of the earcups on a helmet, as well as a speaker enclosure that provides increased structural strength without taking up additional space on the board. The headset also includes a battery compartment that can accept either one of two different size batteries to power the electrical components of the headset.

13 Claims, 16 Drawing Sheets

(51) Int. Cl.
*A42B 3/30* (2006.01)
*H04R 5/033* (2006.01)
*H04B 1/3827* (2015.01)

(52) U.S. Cl.
CPC ............ *H04R 5/033* (2013.01); *H04B 1/385* (2013.01); *H04R 2225/31* (2013.01)

(58) Field of Classification Search
CPC ... H04R 2225/31; A61F 11/14; A42B 3/0406; A42B 3/30; H04B 1/385; H04B 2001/3836
See application file for complete search history.

(56) References Cited

U.S. PATENT DOCUMENTS

| | | |
|---|---|---|
| 5,541,816 A | 7/1996 | Miserendino |
| 5,995,636 A | 11/1999 | Toepholm |
| 6,965,681 B2 | 11/2005 | Almqvist |
| 7,317,809 B2 | 1/2008 | Almqvist |
| 8,166,575 B2 | 5/2012 | Haselmayer |
| 9,014,409 B2* | 4/2015 | Steyn ................... H04R 1/1025 381/370 |
| 9,717,633 B2* | 8/2017 | Waters ................ A41D 13/0002 |
| 9,788,130 B2* | 10/2017 | Muller ................ H04R 25/602 |
| 2008/0075314 A1 | 3/2008 | Chang |
| 2011/0314594 A1 | 12/2011 | Rogers et al. |
| 2017/0340046 A1* | 11/2017 | Le ........................ H04R 1/1066 |

FOREIGN PATENT DOCUMENTS

| | | |
|---|---|---|
| WO | 2017203353 A2 | 11/2017 |
| WO | 2017212053 | 12/2017 |

OTHER PUBLICATIONS

European Patent Application No. 20183538.6—Extended European Search Report dated Nov. 13, 2020.

* cited by examiner

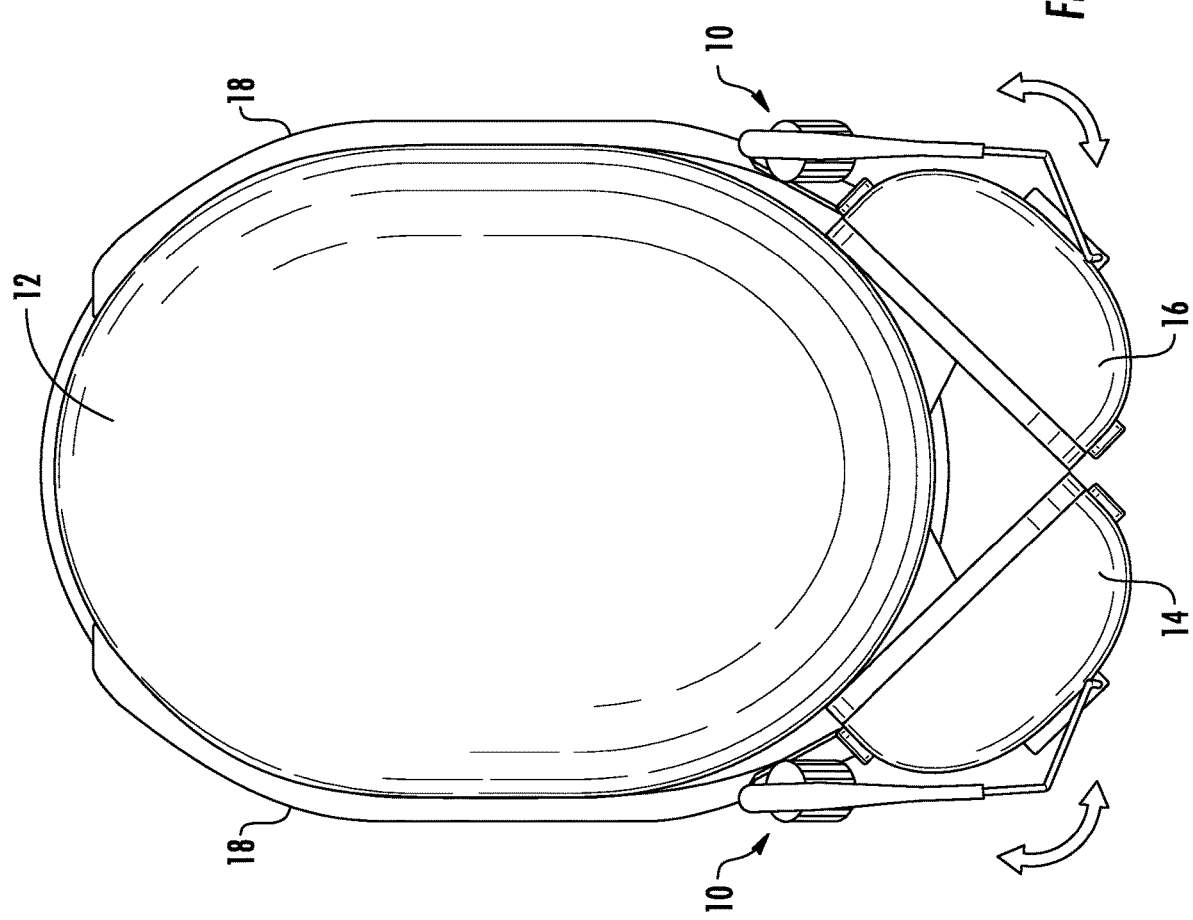

HEADSET WITH DUAL BATTERY COMPARTMENT

BACKGROUND OF THE INVENTION

This application relates to a headset that includes two earcups designed to overlie and seal around the wearer's ears. This type of headset is often worn by a soldier or a fire fighter or a law enforcement officer, to enable communication with colleagues. This type of headset is sometimes worn with a protective helmet, and so must be designed to accommodate such usage.

The headset of the present invention includes several inventive features. These include a system for suspension of the earcups on a helmet, and a speaker enclosure, for mounting on a PC board that provides increased structural strength without taking up additional space on the board.

The inventive features also include a battery compartment that can accommodate two different sizes of batteries and still provide electrical operability to the headset. For reference, a prior art headset includes a battery compartment with a pivotally hinged lid that flips up and down on a body and that is secured closed by a separate screw-type fastener. The body has a cross-sectional configuration defining a chamber that is sized to accommodate two AAA batteries side by side. There are two separate terminals at the bottom end of the body, inside the chamber, to be engaged by the two bottom ends (plus and minus) of two AAA batteries. At the top end of the compartment, the lid has a U-shaped contact that when the lid is closed engages the upper ends of the two AAA batteries to put them in series. The compartment can alternatively accommodate a CR-123 battery, which requires the use of a separate tray that receives the CR-123 battery, because of the size difference between the batteries. The tray is a separate physical element not permanently attached to the body. The CR-123 battery is first put into the tray, then the tray is put into the body. The bottom end wall of the tray has two terminals on its outer end surface that directly engage the two inner body terminals on the inside of the body, when the tray is inserted into the body. These two outer tray terminals receive electrical power from the CR-123 battery, and provide it to the two inner body terminals.

BRIEF DESCRIPTION OF THE DRAWINGS

FIG. 3B is a top plan view similar to FIG. 3B, showing the left and right earcups in a fifth position relative to the helmet;

DETAILED DESCRIPTION

Figure 1:
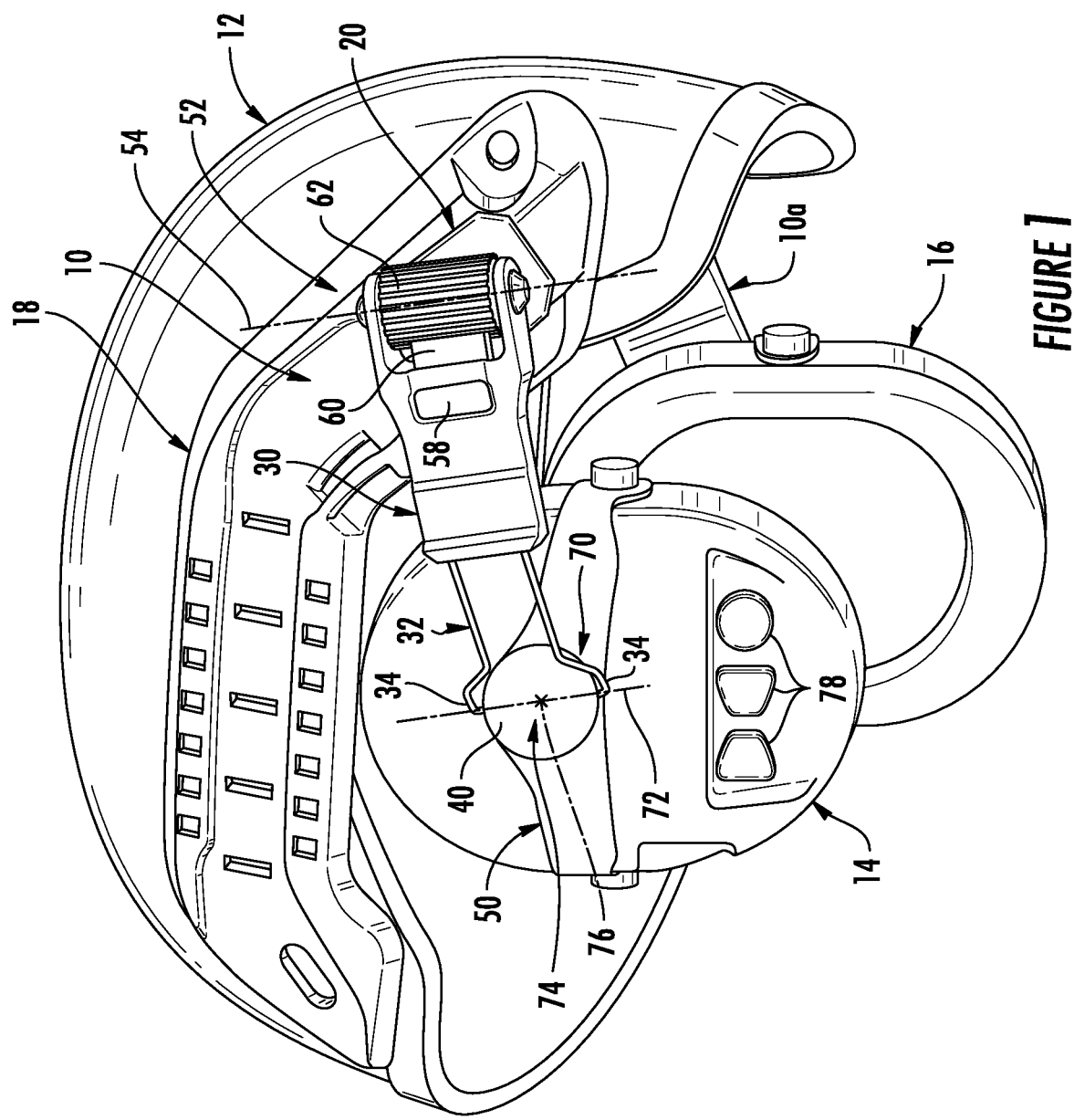
FIG. 1 is a pictorial illustration of a headset that is a first embodiment of the invention, including a left earcup shown mounted on a left side of a helmet and a right earcup mounted on a right side of the helmet.

FIG. 1 illustrates an earcup suspension assembly 10 ("assembly") that is a first embodiment of the invention. The assembly 10 is shown supported on a helmet 12. The helmet 12 could be of any configuration, and could be any head covering device. The particular helmet 12 that is illustrated does not have ear covering portions, thus allowing the assembly 10 to support an earcup on an ear at a location outside of the enclosure of the helmet. The drawings show the helmet 12 as viewed from the left side; the right side is a mirror image, typically. Two earcup suspension assemblies 10 are commonly used with one helmet 12. Thus, the drawings focus on a left side earcup suspension assembly 10 that supports a left earcup 14; a right side earcup suspension assembly 10a is a mirror image and is shown only partially in FIG. 1, supporting a right earcup 16.

The helmet 12 is shown as supporting a left side rail 18. The particular rail 18 that is illustrated is a standard ARC rail, but the invention is usable with other types of rails. Alternatively, an earcup suspension assembly 10 of the present invention can be supported on a different intermediate member or directly on a helmet 12. Thus, the term "rail" as used herein is intended to refer usually to that structure to which the earcup suspension assembly 10 is connected. The term "rail connector" can mean the portion of the assembly 10 that is fixedly supported on the helmet 12, either directly or through an intermediate piece such as a rail 18.

The assembly 10 includes a rail connector 20 that is configured for fixedly engaging the rail 20, to support the assembly on the rail. The assembly also includes a main arm 30 that extends from the rail connector 20. The main arm 30 includes a wireform element 32 that is slidable in and out to adjust the length of the main arm. The outer end 32 of the wireform element 32 is configured as two pins 34 that extend laterally toward each other into a disc 40 that forms part of the assembly 10. The disc 40 pivotally supports a bracket 50 that is secured to the earcup 16 itself. As a result, the earcup 16 is supported on the main arm 30.

The main arm 30 is supported on the rail connector 20 by two joints for movement in two different degrees of freedom. A first joint 52 (FIG. 1) between the main arm 30 and the rail connector 20 allows for a flipping motion, of the main arm relative to rail connector, about an axis 54. The first joint 52 comprises structure on the main arm 30 that engages structure on the rail connector 20. Thus, the main arm 30 can be flipped in and out relative to the rail 18 and the 12 helmet, about the axis 54; the drawings show several such positions.

The assembly 10 includes a spring (not shown) that biases the main arm 30 about the first axis 54, in a direction toward the ear, thus to keep earcup pressure on the user's head as needed. A release switch 58 on the main arm 30 controls the movement of the first joint 52. One or more ribs 60 on the main arm 30 are engageable in grooves 62 on the rail connector 20, to control the flipping motion and to set certain positions. This detent structure both limits the range of motion and avoids undesirable spinning of the earcup 14.

Figure 3A:
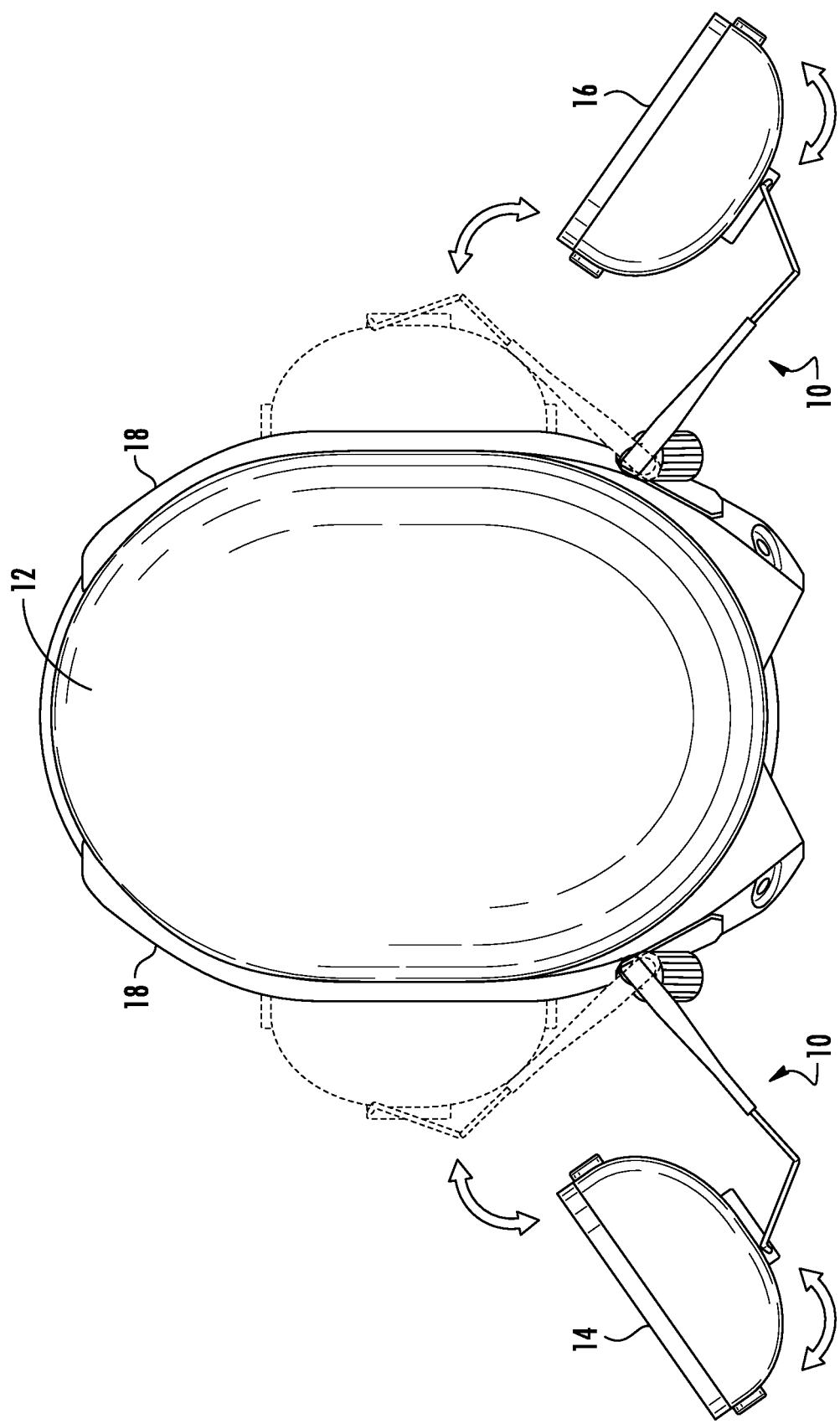
FIG. 3A is a top plan view of the helmet and the left and right earcups, showing the left and right earcups in a fourth position relative to the helmet.

For example, FIG. 1 illustrates a position in which the earcup 14 is against the ear, and FIG. 3A illustrates a position in which the earcup is flipped back up out of the way.

Figure 2A:
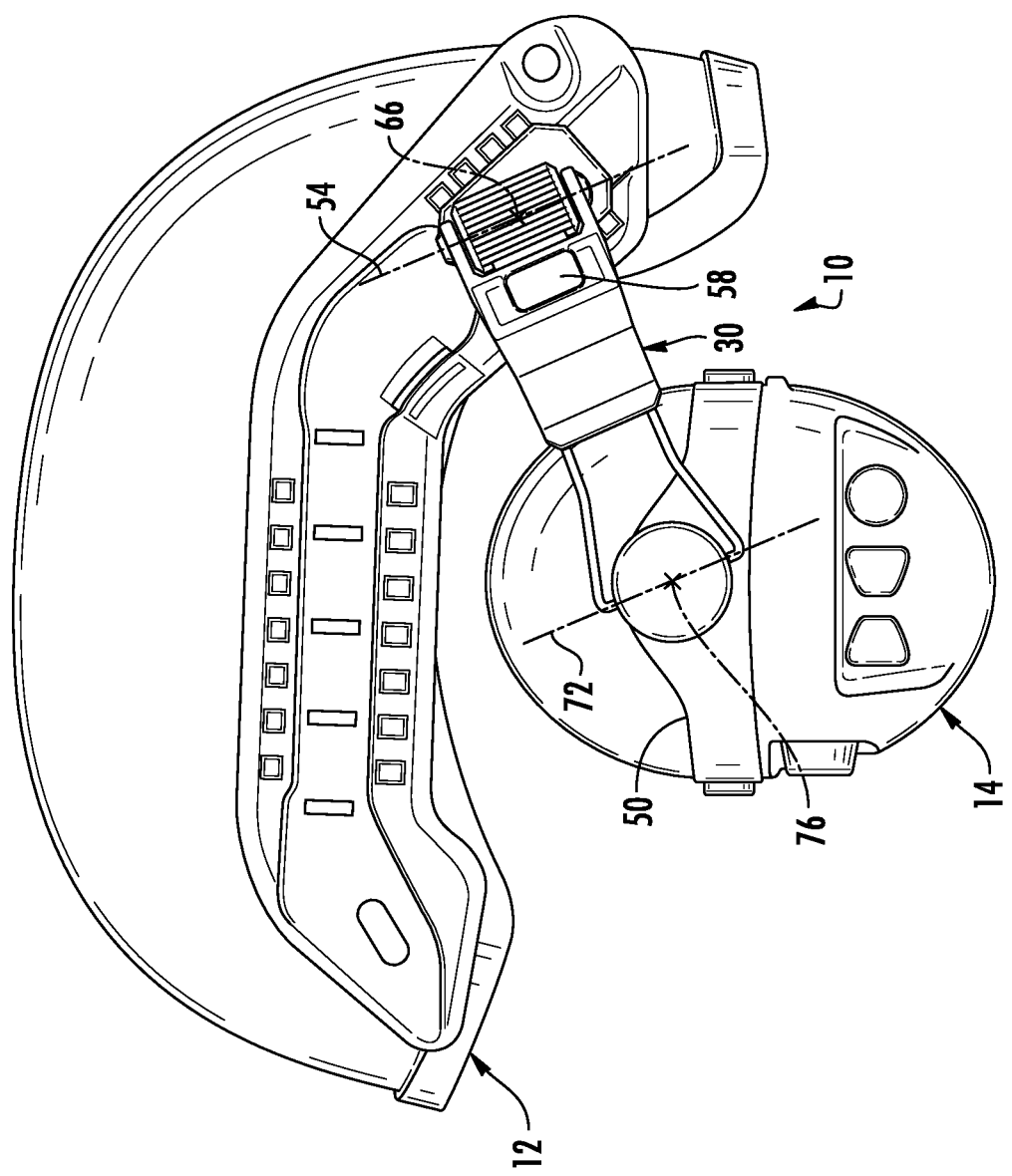
FIG. 2A is a left side elevational view of the helmet and left earcup of FIG. 1, showing the left earcup in a first position relative to the helmet.
Figure 2B:
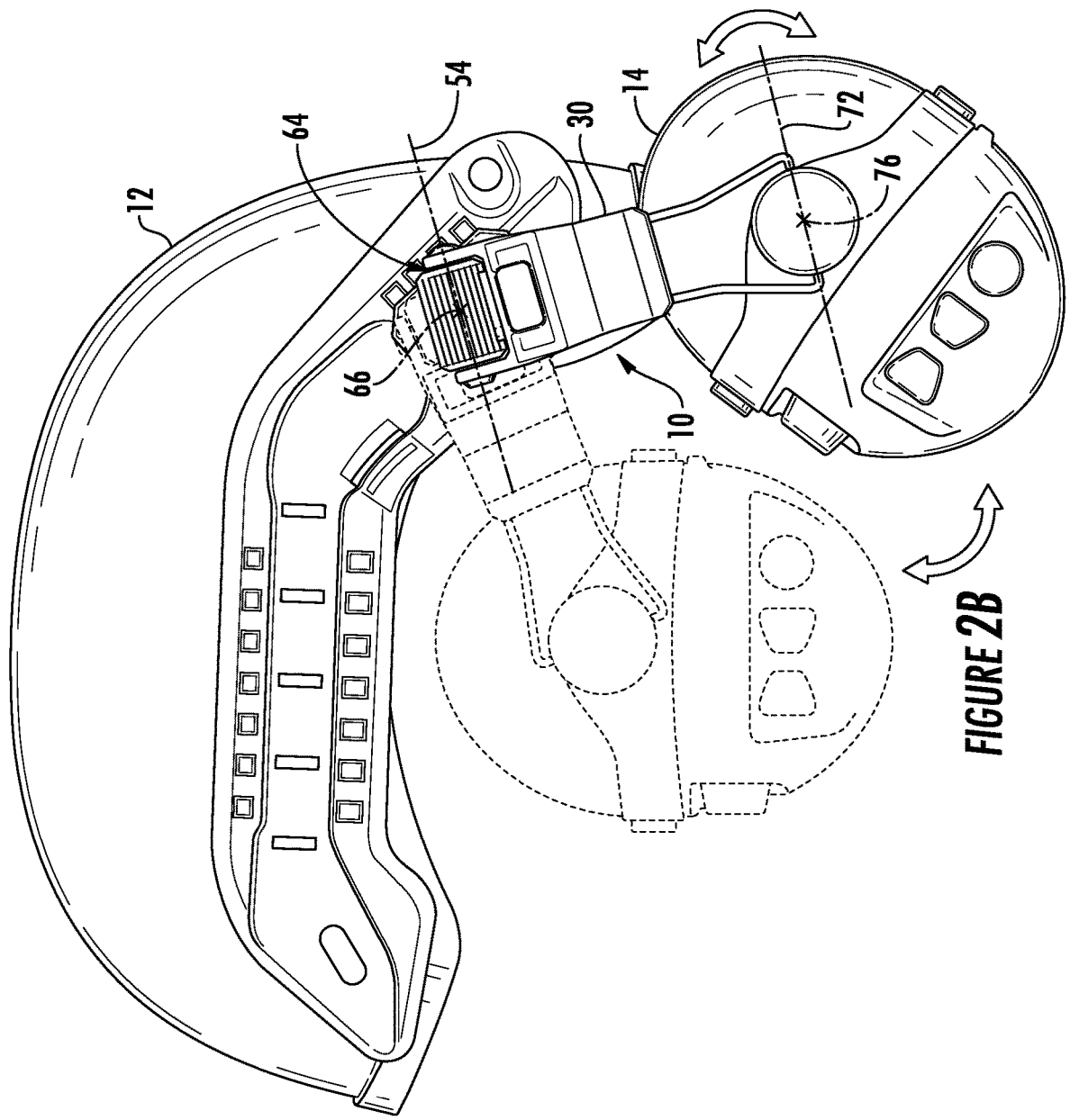
FIG. 2B is a view similar to FIG. 2A, showing the left earcup in a second position relative to the helmet.
Figure 2C:
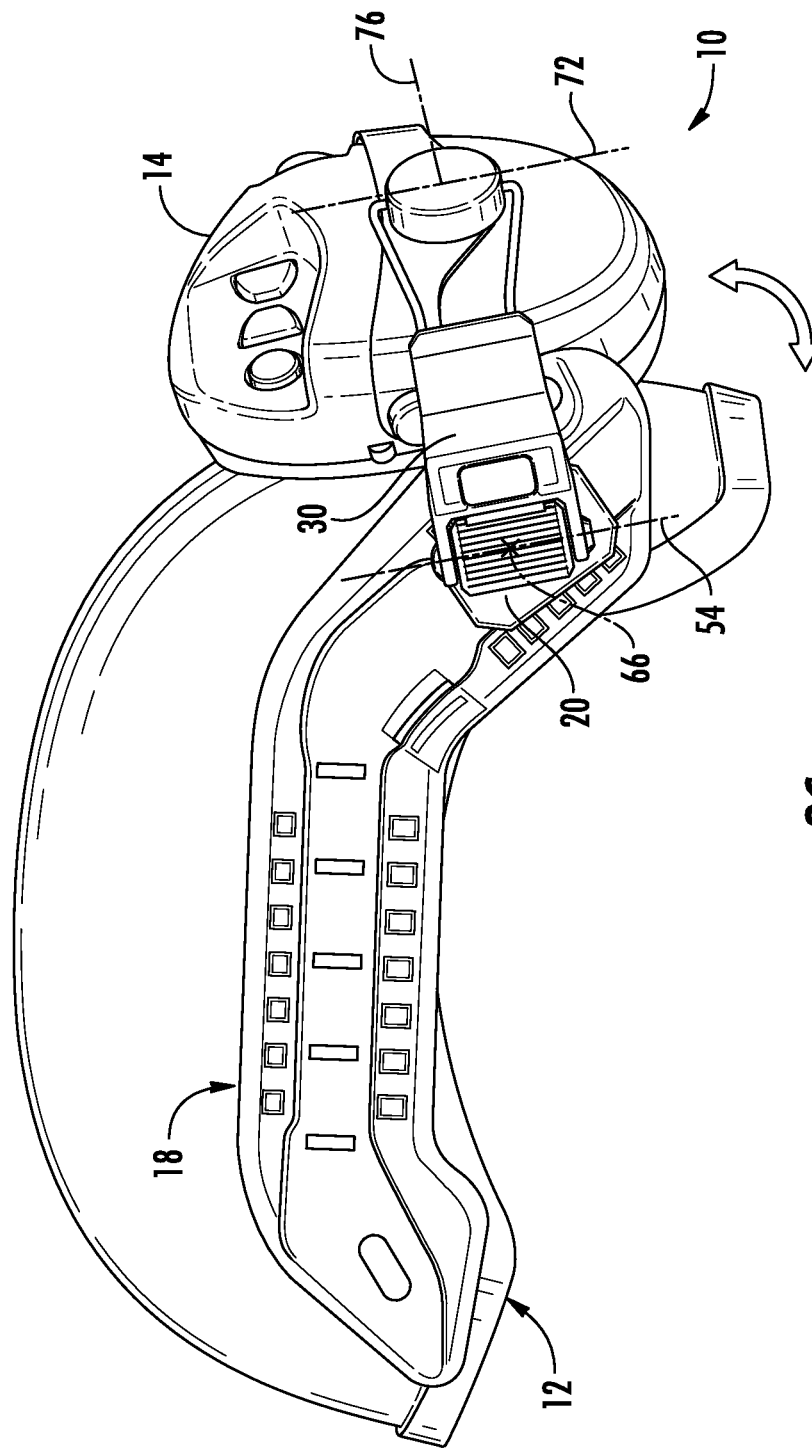
FIG. 2C is a view similar to FIG. 2A, showing the left earcup in a third position relative to the helmet.

A second joint 64 in the assembly allows for pivotal (swinging) movement of the main arm 30 relative to the rail connector 20 (and thus relative to the rail 18 and the helmet 12). The second joint 64 is located between the main arm 30 and the rail connector 20. The second joint 64 comprises structure on the main arm 30 that engages structure on the rail connector 20 that define a pivot axis 66. The pivot axis 66 extends generally normal into the plane of the rail connector 20. The main arm 30 is thus pivotable about the axis 66 between a plurality of different positions, for example as shown in FIGS. 2A and 2B.

A third joint 70 in the assembly 10 provides for a third degree of freedom of movement. The third joint 70 is located between the main arm 30 and the disc and comprises structure on the main arm 30 engaging structure on the disc. Specifically, the two pins 34 of the wireform element 32 of the main arm are received in opposite sides of the disc 40 to provide for pivoting motion about an axis 72 that extends between the two pins. The third joint 70 thus supports the disc 40, as well as the earcup bracket 50 and the earcup 14 itself, for pivotal (flipping) movement relative to the main arm 30 about this axis 72.

A fourth joint 74 in the assembly 10 provides for a fourth degree of freedom of movement. The fourth joint 74 is located between the disc 40 and the bracket 50 and comprises structure on the disc engaging structure on the bracket. The bracket 50 is movable on the disc 40 in a pivoting motion about an axis 76 that extends normal to the plane of the disc and thus into the earcup 14. The fourth joint 74 thus supports the earcup bracket 50 and the earcup 14 itself for pivotal movement relative to the main arm 30 about this fourth axis 76.

As a result of the various joints and degrees of motion, the earcups 14 are movable relative to the helmet 12 in a variety of ways and to a variety of different positions, as shown in the drawings. The earcups 14 can be held snugly on the ears to maintain a tight seal against the user's head and thus provide good audio communication, even when the helmet 12 moves relative to the user's head.

The electrical connection to the earcups 14 is separate, via wires not seen, perhaps under the helmet padding inside the helmet shell. The earcups may include buttons shown schematically at 78 that control the electronics and audio.

Figure 4A:
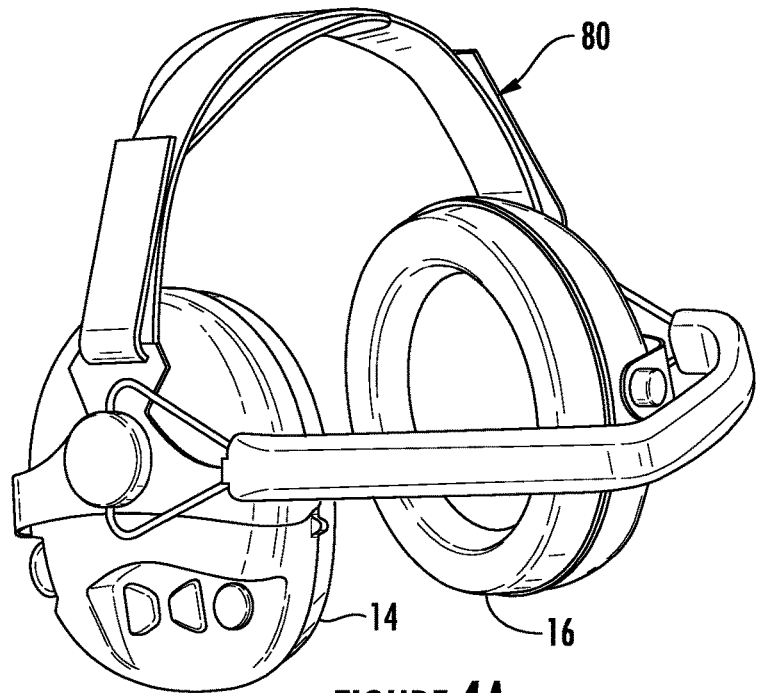
FIG. 4A is an illustration of a headset including straps holding two earcups together.
Figure 4B:
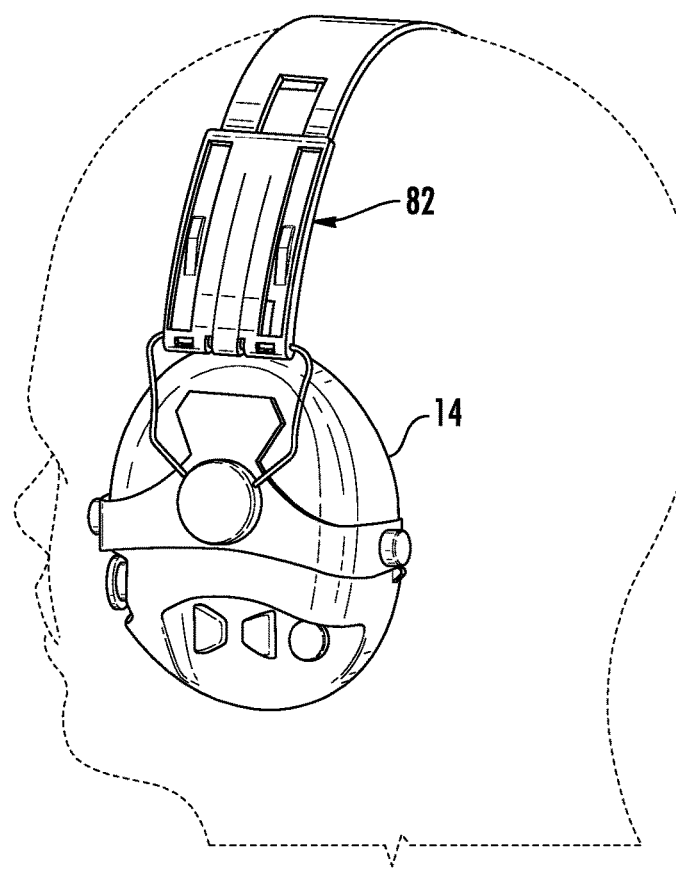
FIG. 4B is an illustration of a headset including a single band holding the two earcups together.

In alternative embodiments, earcups are suspended not on a rail or helmet. For example, FIG. 4A shows two earcups suspended via an assembly, on a webbing strap system 80. FIG. 4B shows two earcups suspended via an assembly, on a rigid but bendable plastic band 82. An earcup suspension assembly of the present invention may also be used to support earcups inside a helmet such as a firefighter's helmet that covers the ears.

Figure 5:
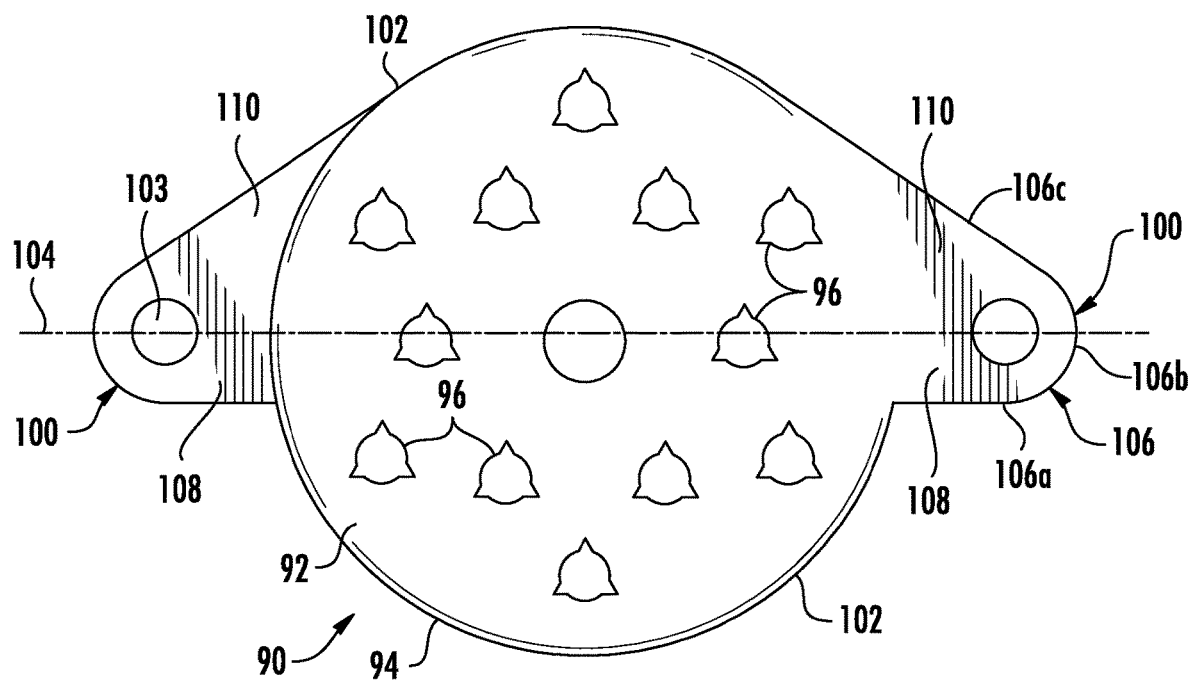
FIG. 5 is a top plan view of a speaker in accordance with the present invention and that is used in the earcup.
Figure 6:
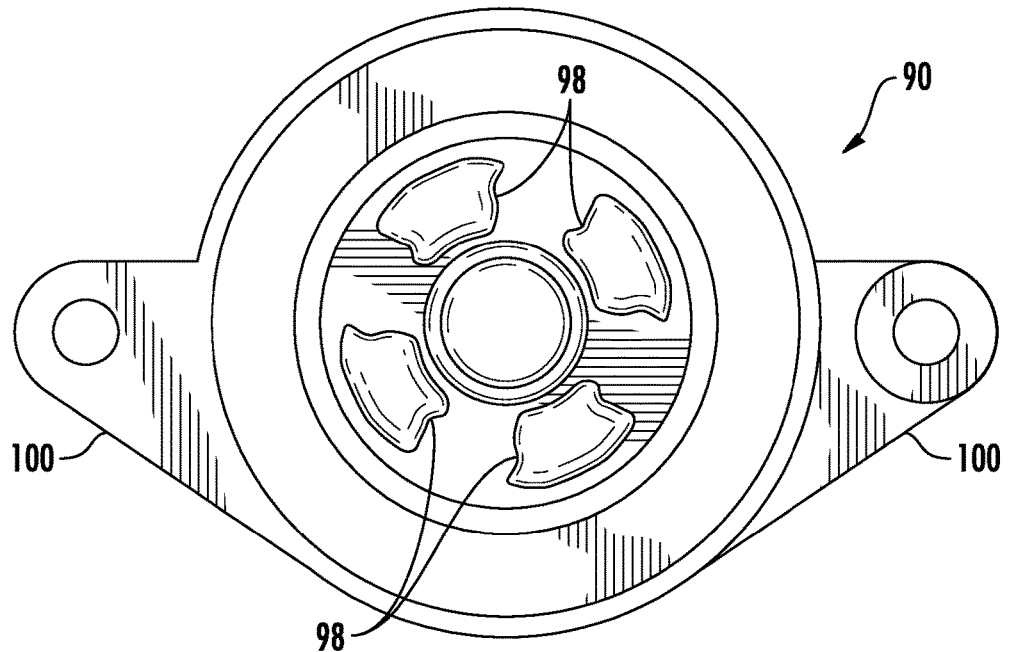
FIG. 6 is a bottom plan view of the speaker of FIG. 5.
Figure 7A:
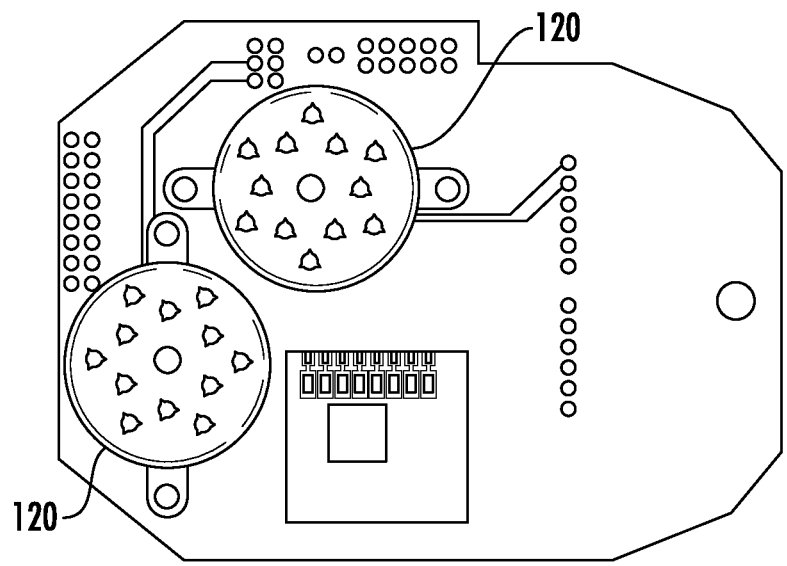
FIG. 7A is a view of a printed circuit board including a prior art speaker.

In accordance with a feature of the invention, each earcup includes two speakers 90 (FIGS. 5 and 6) mounted on a printed circuit (PC) board (FIGS. 7A and 7B) that is incorporated in the earcup. The two speakers 90 are, in the illustrated embodiment, identical to each other in physical configuration and size, for economy of manufacture. In other embodiments, the two speakers 90 could be different, and could have two different electronic components. Other earcups may use only one speaker.

Each speaker 90 includes a plastic housing 92. A circular central portion 94 of the housing 92 encloses the electrical components (not shown) of the speaker. The front or top face (FIG. 5) of the central portion 94 has openings 96 for sound to be emitted. The back or bottom face (FIG. 6) of the speaker 90 has contacts 98 adapted to electrically connect the speaker with the PC board.

The speaker has two mounting portions 100. The mounting portions 100 are located diametrically opposite each other, on the outer periphery 102 of the central portion 94. The mounting portions 100 extend or project from the circular central portion 94. The mounting portions 100 are mirror images of each other.

Each mounting portion 100 has a fastener opening 103 for receiving therethrough a fastener, typically a screw, to fasten the speaker to the PC board. The fastener openings 103 are located on a centerline 104 of the speaker 90.

Each mounting portion 100 has an outer edge surface 106 that extends from the circular outer periphery 102 of the central portion 94 as a continuation of the outer periphery of the central portion. The outer edge surface 106 includes a first segment 106a that extends from the outer periphery 102 in a direction parallel to the centerline 104 and just past the fastener opening 102. A second segment 106b of the outer edge surface 106 of the mounting portion 100 is formed as a circular arc extending from the first segment 106a and around to the opposite side of the fastener opening 103. A third segment 106c of the outer edge surface 106 of the mounting portion 100 extends in a straight line from the second segment 106b back to the central portion periphery 102. The third segment 106c lies tangent to the circular outer periphery 102 of the central portion 94.

As a result of this configuration, each mounting portion 100 of the speaker 90 effectively has two sections 108 and 110, on opposite sides of the centerline 104 of the speaker. The first section 108, which is bounded by the first edge surface segment 106a, is relatively small. The second section 110, which is bounded by the third edge surface segment 106c, is much larger in area and mass than the first section 108.

Because of the extra area and mass of the second section 110, the speaker 90 has significantly greater structural strength in its mounting portions 100, as compared to the prior art speaker 120 (FIG. 7A) which includes only two first sections. As a result of this increased mass and structural strength of the speaker mounting portions 100, there is less chance that they will crack if assembled improperly, if the mounting screw is overly tightened, for example.

Figure 7B:
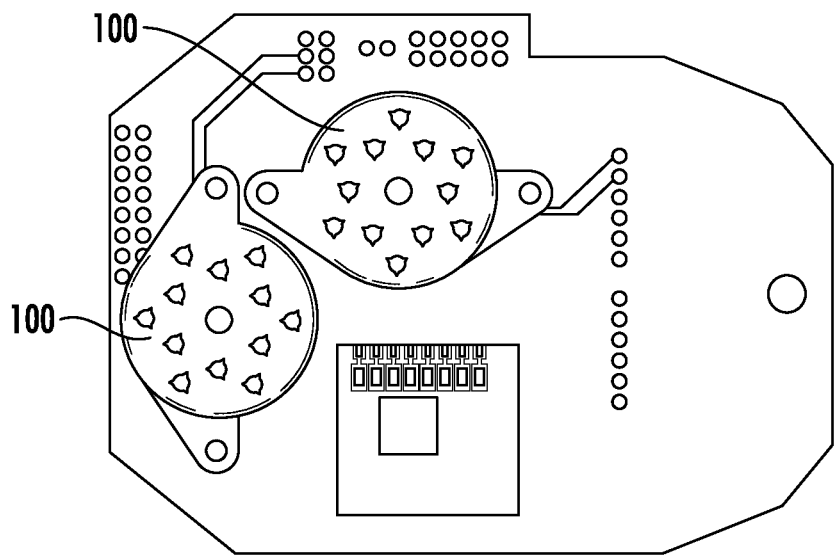
FIG. 7B is a view of the printed circuit board including two of the speakers of FIG. 5 shown mounted in a first orientation relative to each other.
Figure 7C:
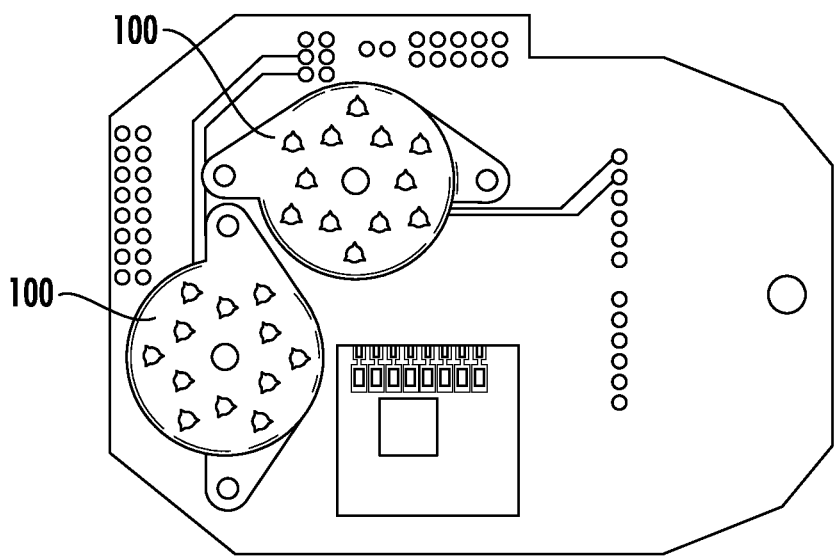
FIG. 7C is a view similar to FIG. 7B and showing two of the speakers of FIG. 5 shown mounted in a second orientation relative to each other.

This increase in strength does not affect usability in an environment that calls for two speakers 100 mounted side by side on a PC board, such as the earcup 14 of the present invention. Because the extra structure is present on only one side of the speaker centerline 104 rather than both, there are various possibilities for placing two speakers 100 of the present invention close together without interference. Two such two possibilities are shown in FIGS. 7B and 7C.

In accordance with another feature of the invention, each earcup 14 can accept either one of two different sizes (types) of commonly used batteries—in this case, AAA batteries or CR-123 (photocell) batteries. As a result, the earcup 14 is more likely to be usable with whatever batteries the user happens to have on hand. AAA batteries are about 45 mm long and about 10.5 mm in diameter. A CR-123 battery is about 34 mm long and about 17 mm in diameter. This feature of the invention is also usable with other types and sizes of batteries.

Figure 8A:
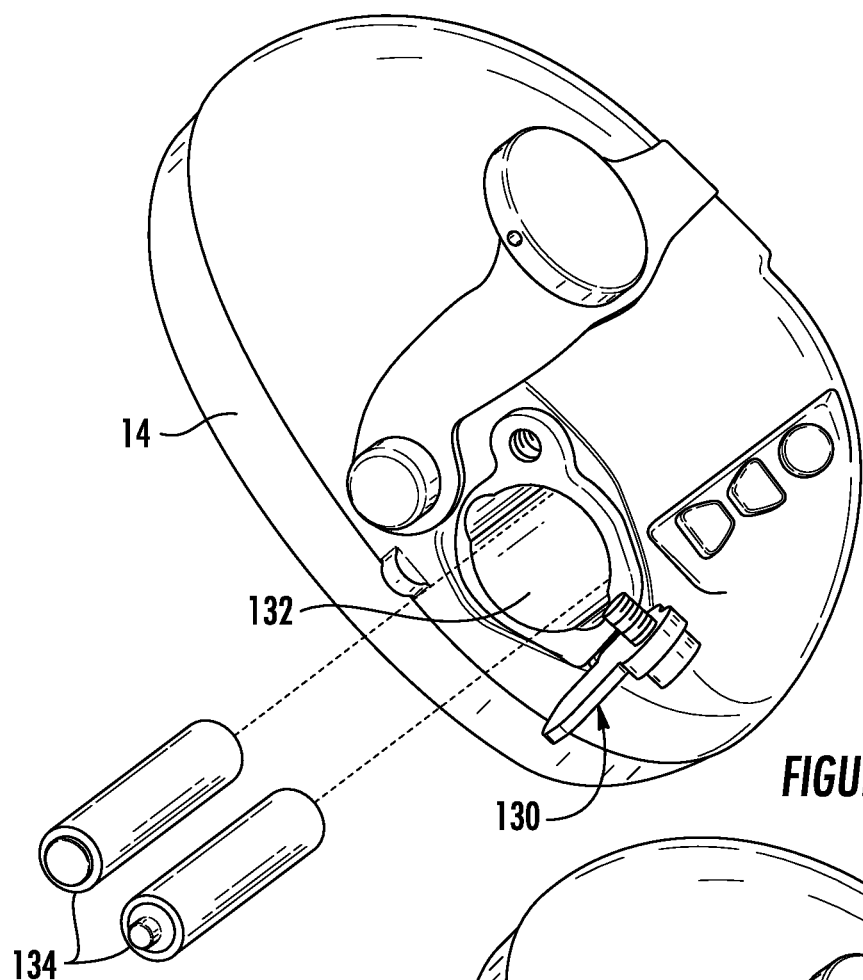
FIG. 8A is an illustration of an earcup with a battery compartment cover open and showing two AAA batteries ready for loading into the compartment.

There is an openable cover 130 (FIG. 8A) on the earcup 14 that forms one end of a chamber 132 in the earcup. First electrical contacts (not shown) are on the inner surface of the cover. At the end of the chamber 132 opposite the cover 130 are a set of second electrical contacts (not shown). The first and second electrical contacts are spaced apart from each other by a distance that is substantially equal to the distance between the terminals on opposite ends of a AAA battery. The chamber 132 can accept two AAA batteries 134 side by side extending the length of the case. The first and second electrical contacts are electrically connected to the electrically powered components of the earcup 14. Thus the AAA batteries 134 can power the earcup.

The compartment can alternatively accept one CR-123 (photocell) battery 136 extending in the same direction as the two AAA batteries 134 would extend. To accomplish this, another set of contacts (not shown) projects inward from the chamber end wall and from the cover 130 to accommodate the shorter battery 134. Therefore, when this single battery 136, which is wider but shorter than the AAA batteries 134, is inserted into the compartment, the single battery can power the earcup 14. Alternatively, the battery or batteries can be placed in a removable battery case that is placed in a compartment in the earcup 14.

FIGS. 9-16B illustrate a battery compartment 140 that is another embodiment of this feature of the invention. Either one or both earcups 14 could have a battery compartment 140 for providing electrical power to the components of the headset 10 that are electrically operated, including the speakers 90. Because the headset 10 is portable, that electric power comes from one or more batteries that are carried in or on the headset 10. The battery compartment 140 can provide such power.

The compartment 140 is illustrated as a physically separate assembly that is inserted into and fixed in the earcup 14 during manufacture of the headset 10, and that is hard wired into the earcup. Alternatively, the battery compartment 140 could be portions of the earcup 14 structure itself rather than a separate element. The compartment 140 may if desired be configured to be removable for repair or replacement; such a construction technique is known and will not be described herein. Still further, the battery compartment 140 may not be hard wired in but rather designed to be removed for battery replacement. The present invention covers all such instances.

The particular compartment 140 shown in the illustrated embodiment is configured to accept either a CR-123 battery 142 or a pair of AAA batteries 144. The term "accept", as used herein, means to physically accommodate the battery or batteries in an electrically operable manner. This does not simply mean that the compartment 140 physically has room to hold one or more batteries of one or more different types. Rather, the headset 10 must be electrically operable in both cases—when the single battery of the first size is inserted and, alternatively, when the pair of batteries of the second size is inserted—with the battery or batteries providing suitable electric power for the electrical components of the headset 10.

The compartment 140 includes as its main component parts a body 150, a lid 180, and a lock arm or lock 210. All these parts are preferably made from an electrically insulating plastic material, for example, the body 150 may be made from Delrin 500P NC 101 plastic. The lock 210 and the lid 180 may be made from the same material plus 30 percent of glass material.

The compartment 140 has a closed inner end (to the bottom as viewed in FIG. 10) and an openable outer end. The compartment 140 is positioned in the earcup 14 so that its open outer end is the end of the compartment that is exposed on the exterior of the earcup 14, to enable insertion and removal of batteries from the compartment and thus from the earcup 14. The outer end of the compartment 140 is selectively openable and closable, as described below in detail.

The body 150 as preferably manufactured includes a side wall element 152 centered on an axis 153 and a separate inner end wall element 154 that are screwed or otherwise fastened together. For convenience, those two elements 152 and 154 are not described separately herein, but rather are described as being one.

The body 150 (described below in detail) has a tubular configuration including a side wall 156 as described below and, at the inner end of the side wall, an inner end wall 158. The inner end wall 158 of the body 150 has an inner surface 160, presented toward the lid 180. The inner end wall 158, and thus the inner end surface 160, is not flat. Rather, the inner end wall 158 is specifically configured to provide spaces and positions for electrical contacts that can engage terminals of two different types (lengths, diameters) of batteries 142 or 144.

The body side wall 156 and the inner end wall 158 together define a chamber 162 in the compartment 140. The chamber 162 receives the selected battery or batteries for powering the electrical components of the headset 10.

In the illustrated embodiment, the two different types of batteries are a CR-123 battery 142 and a AAA battery 144. A CR-123 battery 142 (or "CR battery") is cylindrical, and is shorter and wider than a AAA battery 144. A AAA battery 144 is also cylindrical but is taller (longer) and narrower than the CR battery. Two of the AAA batteries 144 are used to provide the same voltage and power as a single CR battery, the power that is required for the electrical components of the headset 10. Thus, the battery compartment 140 needs to be adapted and configured to accommodate and accept these two physically different types of batteries.

To that end, the inner end wall 158 includes two raised platforms 164 that are 180 degrees circumferentially apart from each other about the axis 153. On each one of the raised platforms 164 is an electrical contact 166, denoted herein as a "CR-negative contact". The lateral distance between these two contacts 166 is selected so that when a CR battery 142 is inserted into the chamber 162 and moved down to the inner end wall 158, both of the CR-negative contacts 166 are engaged by the single negative terminal on the CR battery.

Each one of the two CR-negative contacts 166 is configured as a "pogo pin". This is a spring-loaded metal pin that is resiliently movable vertically relative to the platform. The spring bias of the pin 166 provides a constant upward (away from the inner end wall 158) force on the pin, thus pushing up toward the compartment lid 180. These pins are available from SFENG Professional Pogo Pin Supplier company, among others. As a result, whenever a CR battery 142 is loaded in the compartment 140, it is constantly being urged upward, toward the lid 180.

Each CR-negative contact's pogo pin 166 is connected with a respective lead wire 168 that extends from the outside of the compartment 140 inner end wall 158. The lead wires 168 are a part of a wiring harness 170 that extends from the battery compartment 140 to the electrical components of the headset 10. Two of the pins 166 are used to help provide even (balanced) pressure on the battery compartment lid contacts and the lid lock. This helps to eliminate poor electrical contact and angular pressure on the lid lock.

The two remaining major areas 172 of the inner end wall 158 other than the raised platforms 164 are adapted and configured for being engaged by the AAA batteries 144 when they are inserted. Each one of these two end wall portions 172 is positioned to receive the end of a AAA battery 144 that is accommodated in the compartment 140.

On each one of these major areas 172 of the inner end wall 158 there is located an electrical contact 174, denoted herein as a "AAA contact". Like the CR-123 contacts 166, the AAA contacts 174 are pogo pins from which extend lead wires 176 that are part of the wiring harness 170 that extends from the battery compartment 140 to the electrical components of the headset 10. The AAA contact pogo pins 174 press upward with a spring force. One AAA contact 174 is a positive (+) contact and the other AAA contact 174 is a negative (-) contact.

Figure 12:
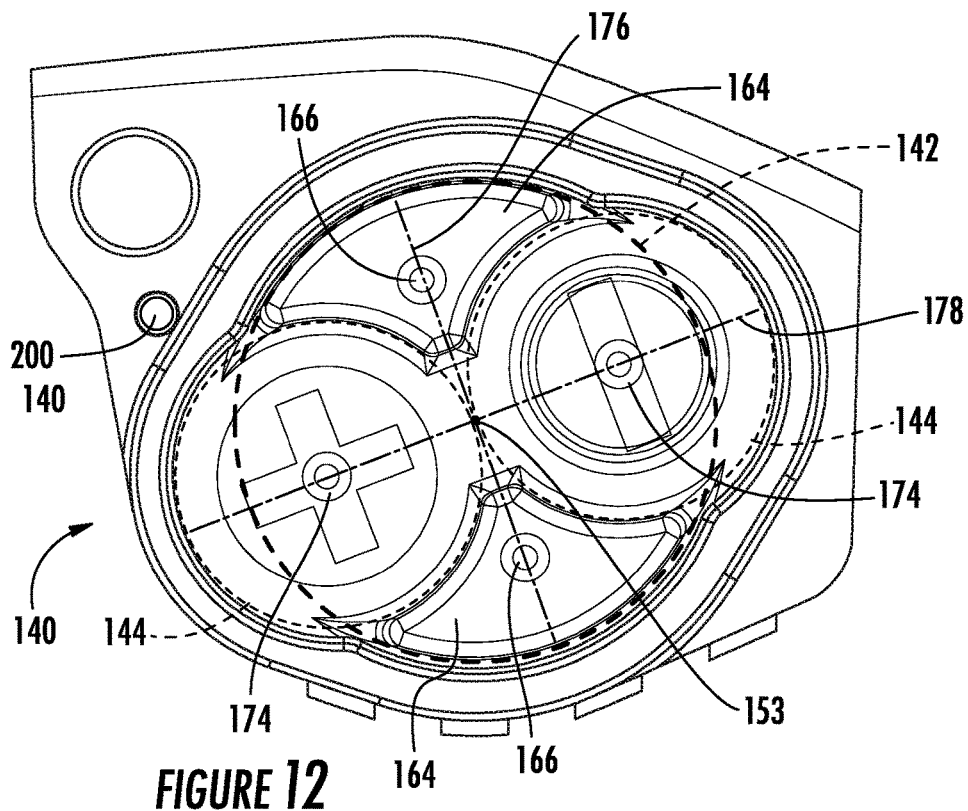
FIG. 12 is a plan view looking into the inner end of the battery compartment of FIG. 9.
Figure 13:
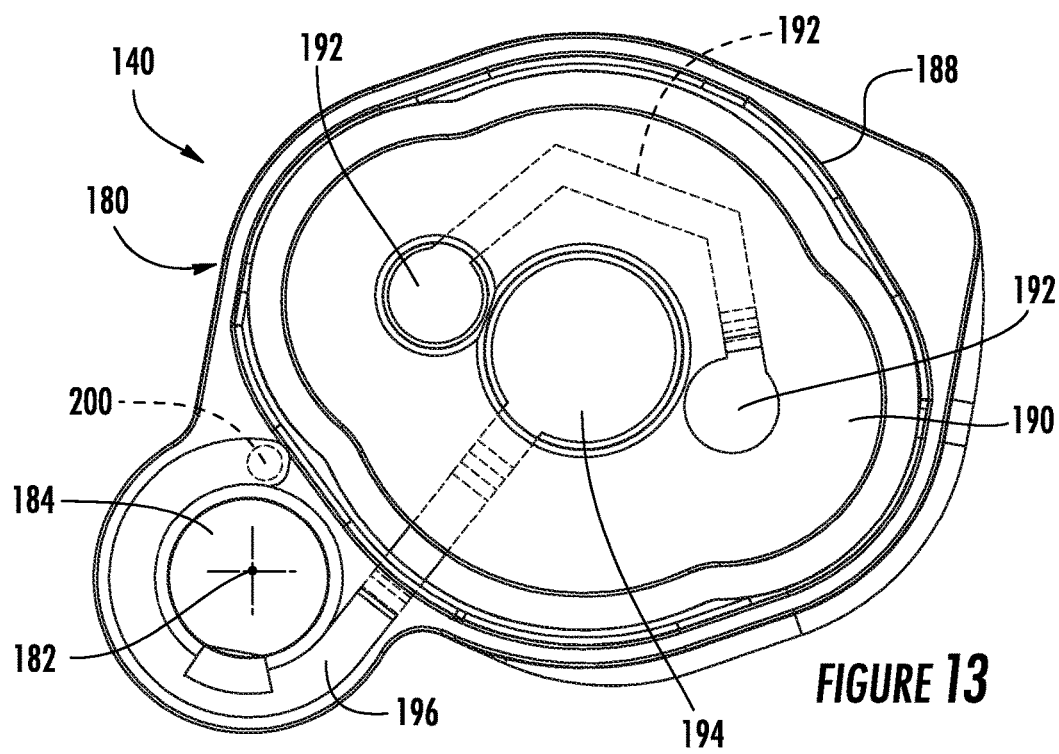
FIG. 13 is a view of the inside of the lid of the battery compartment of FIG. 9.
Figure 14:
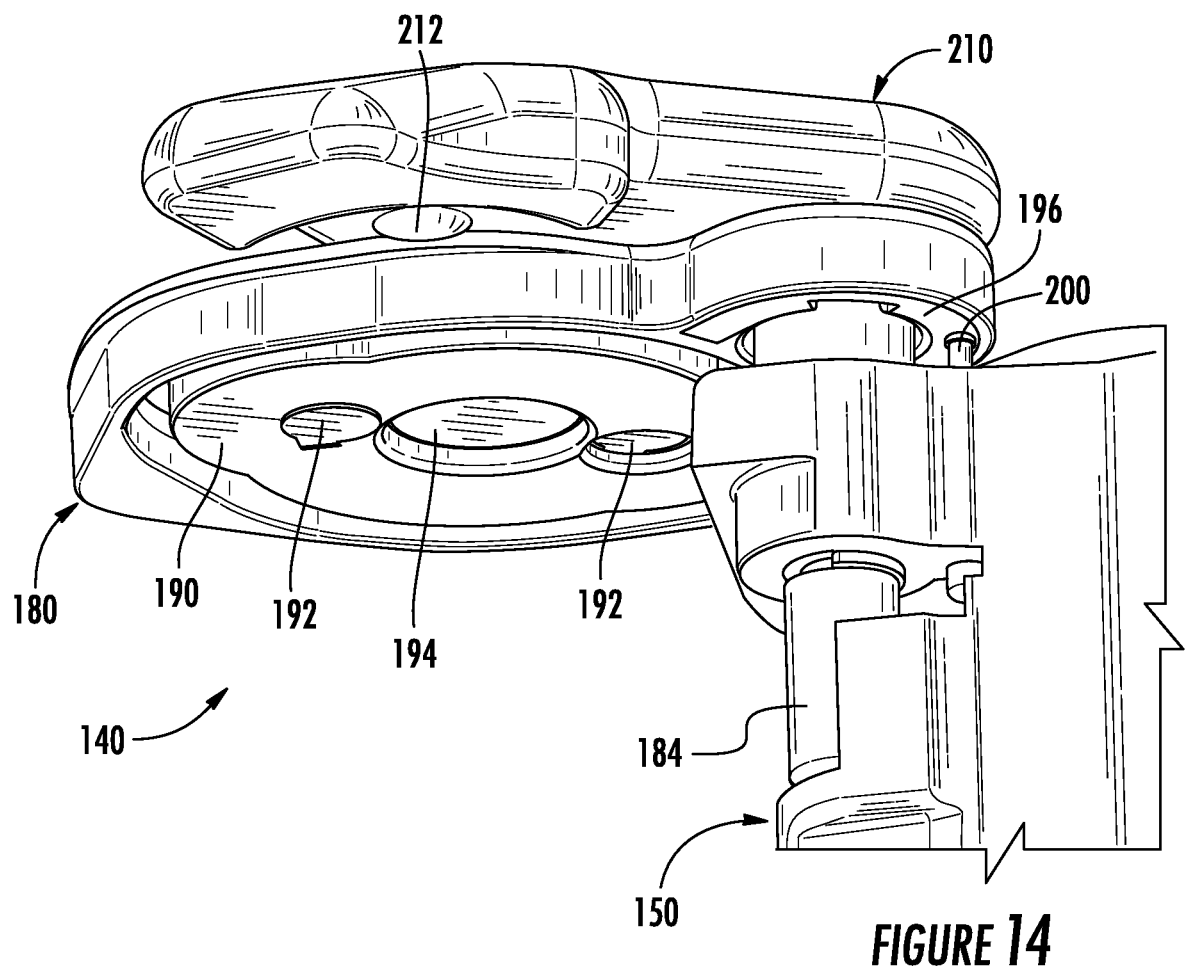
FIG. 14 is a perspective view of portions of the battery compartment of FIG. 9 including a pivot pin, lid, and lock.
Figure 15:
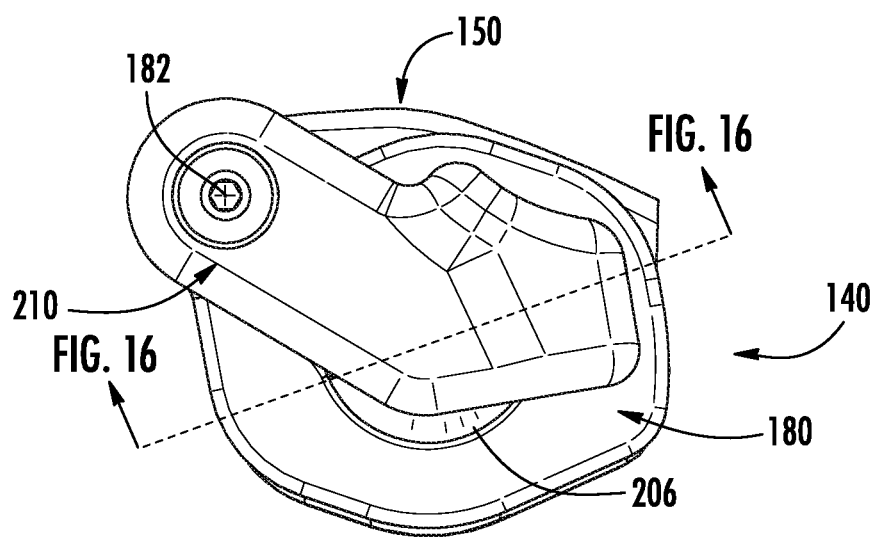
FIG. 15 is a plan view of the battery compartment showing the lid and the lock in closed positions.
Figure 16A:
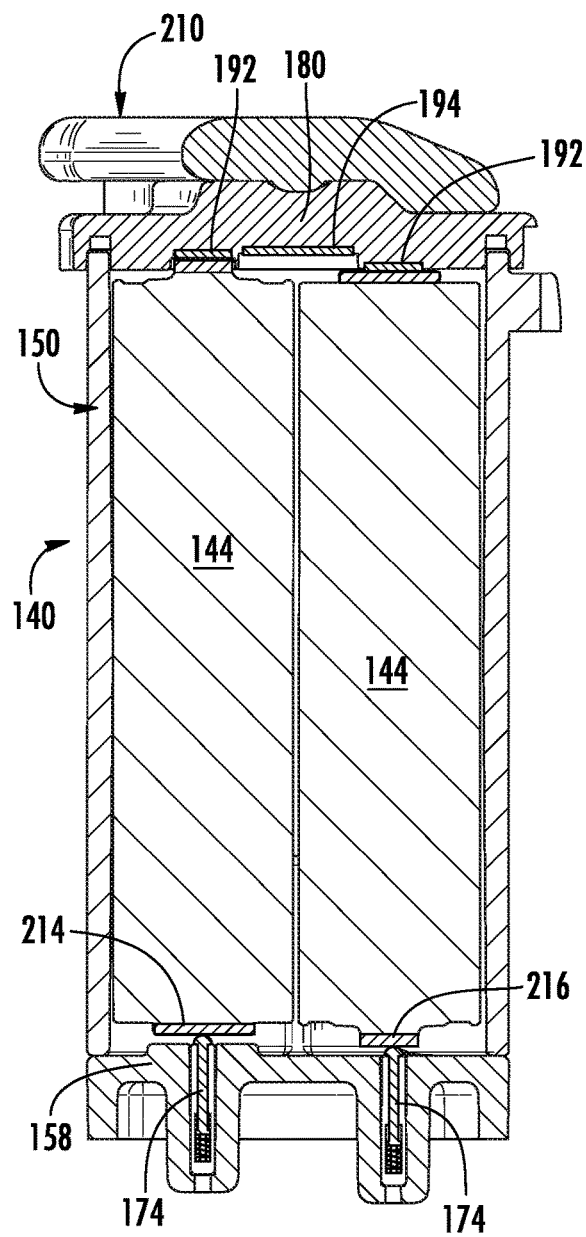
FIG. 16A is a sectional view showing two AAA batteries loaded in the battery compartment.
Figure 16B:
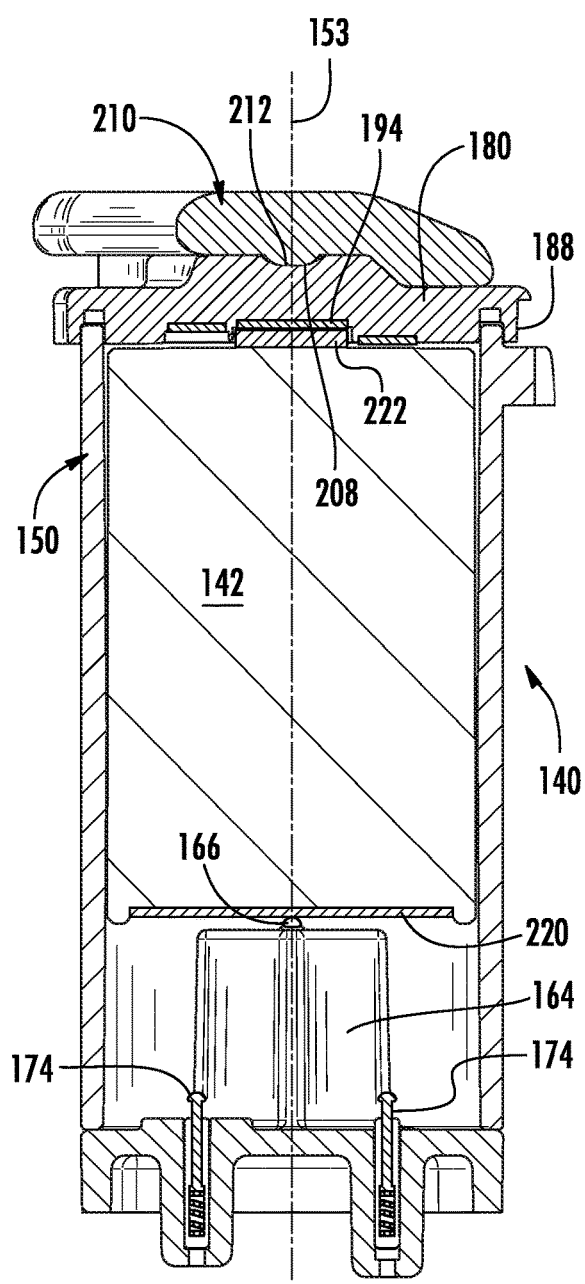
FIG. 16B is a sectional view showing one CR battery loaded in the battery compartment.

As best seen in FIG. 12, for clarity and ease of battery insertion, the areas of the four battery contacts 166 and 174 on the inner end wall may be marked as shown with "+" and "-" markers and/or similar markings.

Because the CR-negative contacts 166 are located on the raised portions of the inner end wall 156 of the compartment 140, the axial (vertical) location of the CR-negative contacts in the compartment is different from that of the AAA contacts 174. Specifically, the CR-negative contacts 166 are closer to the open (outer) end of the compartment 140, than are the AAA contacts 174; this configuration is provided because the CR battery 142 is shorter than the AAA batteries 144. These axial locations are selected so that when the battery compartment 140 is loaded, the outer end terminal of a CR battery 142 is at roughly the same vertical (axial) location in the compartment 140 as are the outer end terminals of the AAA batteries 144, so that both can make electrical contact with the lid 180, as described below.

The side wall of the compartment 140, like the inner end wall of the compartment 140, is also specially configured to accommodate either a CR battery 142 or a pair of AAA batteries 144. Specifically, the side wall is not cylindrical but rather is oval, with (FIG. 12) a minor axis 176, and a with major axis 178 that is longer than the minor axis. The length of the compartment's minor axis 176 is selected to be approximately the width of the CR battery 142, so that the compartment side wall 156 thus supports the CR battery laterally in the compartment 140. Similarly, the length of the compartment 140 major axis 178 is selected to be approximately the width of the two AAA batteries 144 side by side, so that the compartment side wall 156 supports and positions the two AAA batteries laterally in the compartment 140. The two raised platforms 164 also help to support and position the inner end portions of the two AAA batteries 144 laterally in the compartment 140.

As noted above, the outer end wall of the compartment 140 is formed by the lid 180. The lid 180 is preferably made from the same plastic material as the body 150 but with an addition of 30 percent of glass material for strength and durability. The lid 180 is a separate physical element that is movable relative to the body 150. Specifically, the lid 180 is supported on the body 150 for pivotal movement relative to the body 150 about a pivot axis 182. The pivot axis 182 is defined by a pivot pin 184 which, in the illustrated embodiment, is made from stainless steel. The pin 184 is fixed vertically in the body 150 by a snap ring 186 but may be rotatable within the body 150.

The lid 180 is rotatable on the pin 184. The lid 180 is also movable vertically on the pin 184. Thus, as described below in detail, the lid 180 can be moved (raised up) to clear the body 150 and swing into and out of position relative to the outer end of the body 150. The lid 180 can be dropped down when in position over the outer end of the body 150 to close the compartment 140.

The lid 180 has an oval configuration that mirrors that of the open outer end of the body 150, so that when the lid 180 is closed it covers the outer end of the body 150. The lid 180 has a peripheral rim 188 that is dimensioned to fit inside the side wall 156 of the body 150 when the lid drops into place vertically on the body 150. This engagement helps to hold the lid 180 laterally in place on the body 150.

On the inner surface 190 of the lid 180 (facing the inner end wall 158 of the compartment 140) there are provided several electrical contacts. A first one of these electrical contacts is a AAA connector contact 192. The AAA connector contact 192 has a U-shaped configuration to engage and electrically interconnect the terminals on two AAA batteries 144 that are in the compartment 140.

A second one of these electrical contacts on the lid 180 is a CR+ contact 194. The CR+ contact 194 is configured and positioned to engage the positive terminal on a CR battery 142 that is loaded in the compartment 140. The CR+ contact 194 has a hook-shaped arm portion 196 that extends to the outer periphery of the lid 180, near the pivot pin 184. This arm portion 196 is continuously engaged by a fifth pogo pin 200 that is fixed in the compartment body 150 near the outer end of the compartment body. That is, the contact arm portion 196 is engaged by the pin 200 when the lid 180 is swung out to an open position, swung in to a closed position, or anywhere in between. This fifth pogo pin 200 is connected to a lead wire 202 that runs down the outside of the body 150 and into the wiring harness 170. As a result, the CR+ contact 192 on the lid 180 is electrically connected with the electrical components of the headset 10.

The opposite outer surface 204 of the lid 180 is configured to lockingly engage with the lock 210. Specifically, the outer surface 204 of the lid 180 includes a raised wall 206 surrounding a circular cavity or detent 208, at or near the center of the lid 180.

The lock 210 is a separate element that is located axially outside of the lid 180; thus, the lid 180 is positioned between the lock and the body 150. The lock 210 is pivotable on the pivot pin 184 about the pivot axis 182. The lock 210 is preferably not vertically movable on the pivot pin 184. The lock 210 has a protrusion or ball 212 near its outer end, on its inner surface that is adjacent to the lid 180. This ball 212 is dimensioned to fit into the detent 208 in the lid 180.

The lock 210 is not completely rigid but rather is slightly bendable along its length. Specifically, the outer end of the lock 210, which carries the ball 212, can be raised or bent up relative to the inner end of the lock, which engages the pivot pin 184. This flexibility allows the lock 210 to releasably engage with and disengage from the lid 180, to close and open the compartment 140, as described below in detail.

When it is desired to power the headset 10 with two AAA batteries 144, the lock 210, if not already open, is opened by manually pivoting it relative to the body 150 and the lid 180. As the lock 210 swings, the ball 212 on the lock 210 is urged up out of the detent in the lid 180, riding up and over the lid wall. To enable this, the lock 210 deforms by bending, with its outer end moving up relative to the inner pivot end. When the lock 210 is swung far enough over, the lid 180 can be raised up off the body 150 and pivoted away from the body 150, like the lock 210. The chamber 162 in the compartment 140 is thus exposed.

Two AAA batteries 144 are inserted into the chamber 162, one with the positive end up and one with the negative end down. The negative terminal 214 on one of the batteries 144 engages one of the two pogo pin AAA contacts 174 on the inner end wall 158 of the body 150. The positive terminal 216 on the other AAA battery 144 engages the second one of the two pogo pin AAA contacts 174 on the inner end wall 158 of the body 150.

The lid 180 is then swung closed to a position over the chamber 162, and dropped down onto the body 150. The rim 188 of the lid 180 engages inside the side wall of the body 150, which engagement keeps the lid 180 in place laterally.

When the lid 180 is thus in place, the AAA contact 192 on the underside of the lid 180 engages the two outward facing terminals on the AAA batteries 144, one negative and the other positive. The two batteries 144 are thus placed in series by the AAA contact 192. Because the opposite (inner) ends of the AAA batteries 144 are in engagement with the terminals 174 on the inner end wall of the compartment 140, the AAA batteries are electrically connected with the electronic components of the headset 10 and can power the headset 10.

Next, the lock 210 is swung to its closed position, over the lid 180, to secure the battery compartment assembly with the two AAA batteries 144 inside. As the lock 210 swings inward, the ball on the under side of the lock 210 engages the wall on the outside of the lid 180. This engagement, as the lock 210's swinging movement continues, causes the lock 210 to flex or bend upward, and the ball travels over the wall and drops into the detent on the lid outer surface.

The positioning of the lock 210 over the lid 180, with the lock not being movable axially away from the body 150 (because it is fixed vertically on the shaft which is fixed vertically on the body), holds the lid 180 down on the body to keep the assembly closed. The lock 210 would need to be deformed, or pivoted out of the way, to open the lid 180.

The engagement of the ball 212 in the detent 208 secures the lock 210 in position on the lid 180, both axially and laterally. Because the lid rim 188 secures the lid 180 in position on the body 150 laterally, the lid is thus secured both axially and laterally on the body 150. This securing by the lock 210 and lid 180 maintains the batteries 144 in position in the chamber 162 of the compartment 140, and maintains the electrical connection of the batteries in the headset 10. The headset 10 is thus electrically operable via the power from the two AAA batteries 144.

The force of the spring-loaded pogo pins helps to maintain the compartment 140 assembly closed. Specifically, the four pogo pins 174 and 166 at the inner end of the compartment 140 are spring loaded to provide an upwardly-directed force. When the two AAA batteries 144 are in place, the pins 174 push them upward against the lid 180. This upward force on the lid 180 helps to hold the lid in tight engagement with the lock 210. Similarly, when the single CR battery 142 is loaded, the pins 166 push the CR battery upward against the lid 180, which helps to hold the lid in tight engagement with the lock 210. Finally, the fifth pogo pin 200, which is at the top of the body 150 and which engages the CR-positive contact 162 on the underside of the lid 180, continuously pushes upward on the lid 180. This upward force on the lid 180 helps to hold the lid in engagement with the lock 210 and thus secure the entire assembly.

When it is desired to power the headset 10 with one CR-123 battery 142, the AAA batteries 144, if present, are removed. The CR-123 battery 142 is inserted into the chamber 162, with the negative end down and the positive end up. The negative terminal on the CR-123 battery 142 engages the two pogo pin CR-negative contacts 166 on the inner end wall 158 of the body 150.

The lid 180 is then swung to a position over the chamber 162, and dropped down onto the body 150. The rim 188 of the lid 180 engages inside the side wall of the body 150 to keep the lid in place laterally. The CR-positive contact 194 on the underside of the lid 180 engages the positive terminal 222 of the CR battery 142. Because the fifth pogo pin 200 is continuously in engagement with the hook portion 196 of the CR positive contact 194, the CR battery 142 is thus electrically connected with the electronic components of the headset 10 and can power the headset 10.

The lock 210 can then be swung to its closed position, over the lid 180, to secure the battery compartment 140 with the single CR battery 142 loaded inside. The lock 210 swings into locking engagement with the lid 180. The lid 180 is thus secured axially and laterally on the body 150. This securing maintains the CR battery 142 in position in the chamber 162 of the compartment 140, and maintains the electrical connection of the battery in the headset 10. The headset 10 is thus electrically operable via the power from the single CR battery 142.

Figure 8B:
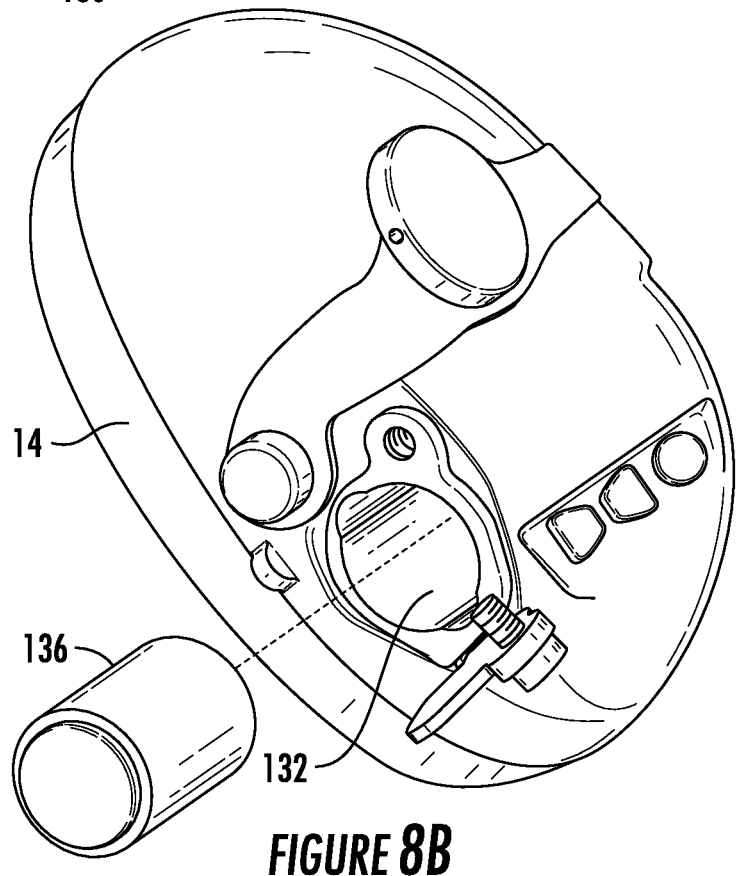
FIG. 8B is an illustration similar to FIG. 8A and showing one CR-123 battery ready for loading into the compartment.
Figure 9:
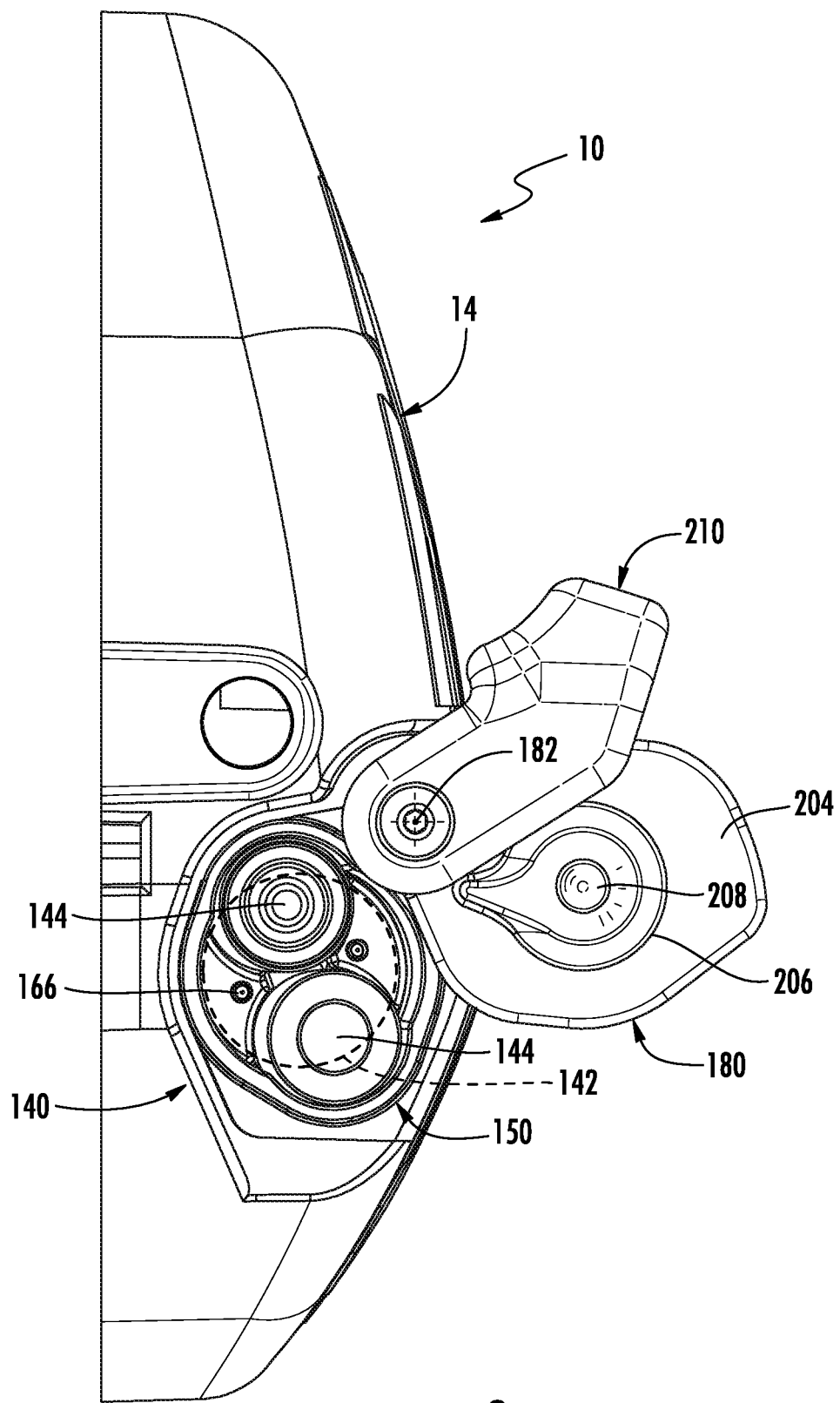
FIG. 9 is an illustration of another battery compartment that is an embodiment of the invention, with its lid and lock open and showing two AAA batteries loaded in the compartment.
Figure 10:
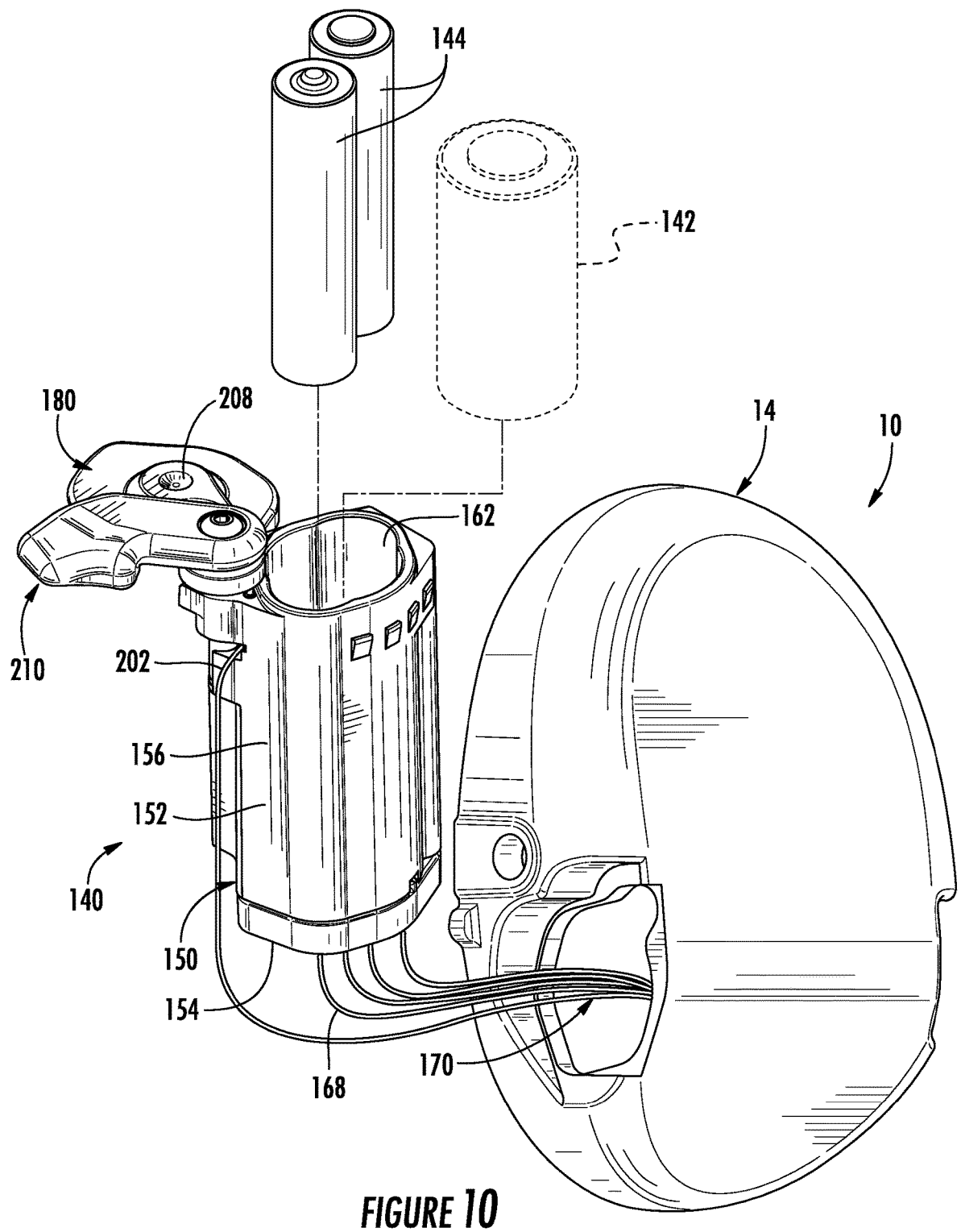
FIG. 10 is a perspective illustration showing the physical relationship between the battery compartment of FIG. 9 and the earcup, and also showing a CR-123 battery that can be loaded in the compartment.
Figure 11:
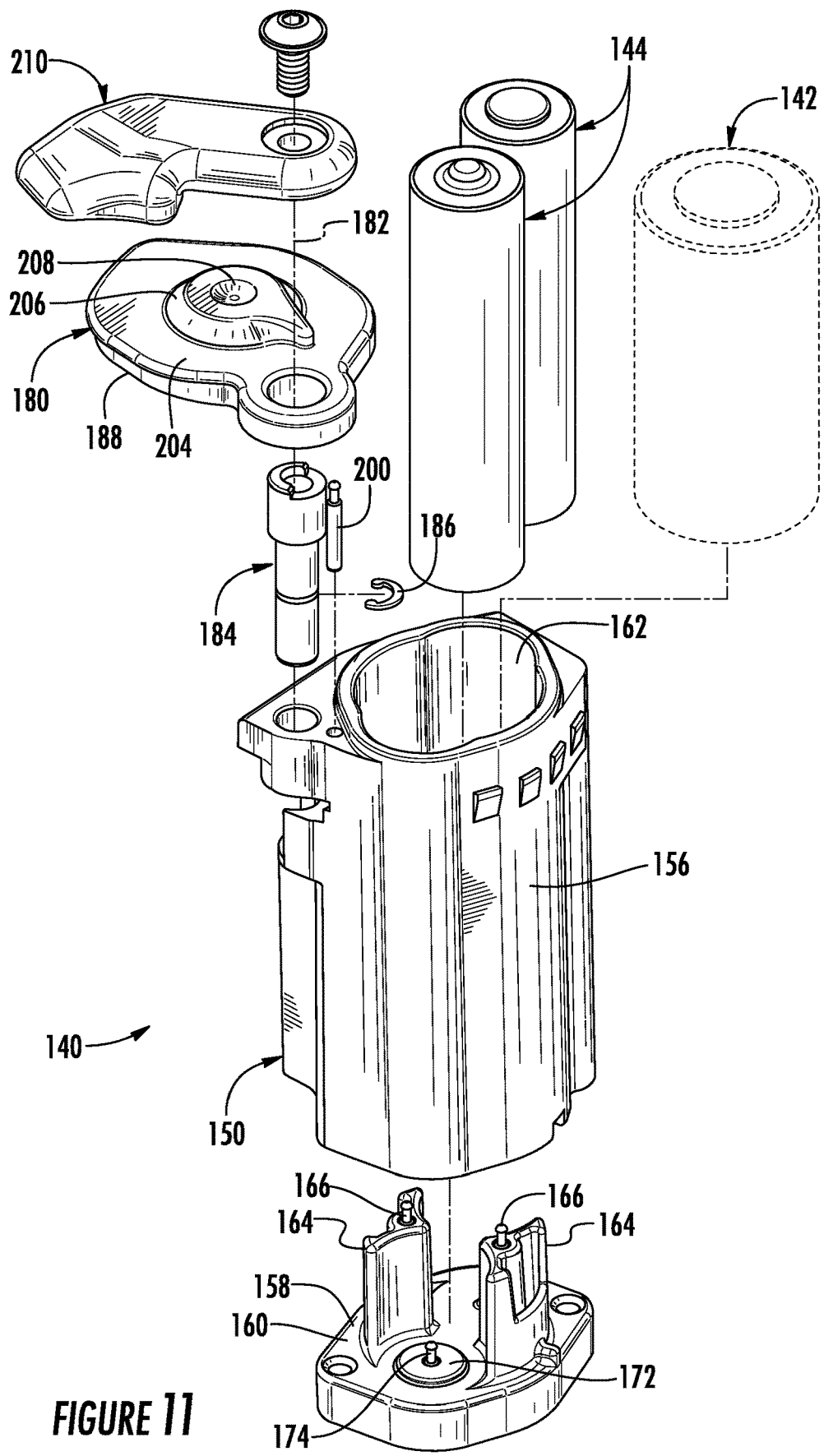
FIG. 11 is an exploded perspective view of the battery compartment of FIG. 9.

The closure mechanism for the compartment 1400 (the lid 180 and lock 210) operates without a separate fastener. This is advantageous as compared to the closure mechanism shown in the first embodiment (FIGS. 8A and 8B) which use a screw. No screwdriver is required. In addition, there is no screw head that might interfere physically with the wire form arm 32, as in the first embodiment.

The invention claimed is:

1. A headset for receiving and seeing radio communications, comprising:
   left and right earcups each including electrical components of the headset; and
   in one of the left and right earcups, a battery compartment that is configured to accept a power source that is either (i) a single one of a first size of battery or (ii) a pair of a second size of battery that is a different length from the first size of battery;

the electrical components in the headset being electrically operable via power from the power source in the battery compartment when the single one of the first size of battery is loaded in the battery compartment, and also being electrically operable when the pair of the second size of batteries is loaded in the battery compartment;

the compartment having electrical contacts for the first and second sizes of batteries that are fixed at a first end of the compartment, and having movable electrical contacts for the first and second sizes of batteries at an opposite second end of the compartment.

2. A headset as set forth in claim 1 wherein the first size of battery is a CR-123 battery and the second size of battery is a AAA battery.

3. A headset as set forth in claim 1 wherein the electrical contacts that are fixed at the first end of the battery compartment include two raised platform contacts for engaging a shorter one of the first size of battery and two non-raised contacts for engaging longer ones of the second size of battery.

4. A headset as set forth in claim 3 wherein the two raised contacts are configured to engage the negative terminal of a CR battery when the CR battery is loaded in the battery compartment, and the two non-raised contacts are configured to engage the ends of two AAA batteries when the AAA batteries are loaded in the battery compartment.

5. A headset as set forth in claim 2 wherein the electrical contacts at the second end of the battery compartment include two AAA contacts that are in series with each other and a single CR contact.

6. A headset as set forth in claim 1 wherein the compartment includes a pivotable lid that supports the movable electrical contacts at the second end of the battery compartment, the lid being pivotable between a closed position covering the compartment and an open position, the compartment also including a pivotable lock to secure the lid and thus the batteries in the compartment.

7. A headset as set forth in claim 6 wherein the three electrical contacts at the second end of the battery compartment include two AAA contacts that are in series with each other and a single CR contact.

8. A headset as set forth in claim 7 wherein the single CR contact includes a pin engagement portion that is continuously engaged by an outer spring loaded electrical contact and the compartment includes a lead wire that connects the outer spring loaded electrical contact to the electrical components of the headset.

9. A headset as set forth in claim 6 wherein the lock is resiliently deformable to engage and secure the lid in place on the compartment without fasteners.

10. A headset as set forth in claim 1 further including a pivotable lid having a plurality of electrical contacts for batteries loaded in the compartment, and a spring loaded electrical contact that is in continuous electrical contact with the one of the plurality of electrical contacts of the lid.

11. A headset for receiving and sending radio communications, comprising:

left and right earcups each including electrical components of the headset including one or more microphones and one or more speakers; and in one of the left and right earcups, a battery compartment that is configured to accept a power source that is either (i) a single one of a first size of battery or (ii) a pair of a second size of battery that is a different length from the first size of battery;

the electrical components in the headset being electrically operable via power from the power source in the battery compartment when the single one of the first size of battery is loaded in the battery compartment, and also being electrically operable when the pair of the second size of batteries is loaded in the battery compartment;

the compartment including:
a body;
a lid that is supported on the body for pivotal movement relative to the body between an open position and a closed position; and
a lock that is supported on the body for pivotal movement relative to the lid and the body between an open position and a locking position;

the lid having electrical contacts which are configured to engage the two different battery sizes when the lid is in the closed position, the lock when in its locking position resiliently engaging the lid to secure the lid and thus the batteries in the compartment.

12. A headset as set forth in claim 11 wherein the lock secures the lid without the use of a separate fastener.

13. A headset as set forth in claim 11 wherein the first size of batten is a CR-123 battery and the second size of battery is a AAA battery.

\* \* \* \* \*